Dec. 11, 1956     T. YEOMAN     2,773,927

STORAGE BATTERY CELL UNIT ACID CONTAINER

Filed July 14, 1955

INVENTOR.

Theodore Yeoman

United States Patent Office 2,773,927
Patented Dec. 11, 1956

2,773,927

STORAGE BATTERY CELL UNIT ACID CONTAINER

Theodore Yeoman, Iowa City, Iowa

Application July 14, 1955, Serial No. 522,036

3 Claims. (Cl. 136—166)

This invention relates to an acid container to be assembled in each cell of automotive type batteries having active dry charged plates. Batteries of this type having properly treated plates are usually filled with full strength electrolyte before being put into operation.

The object of this invention is to supply a sulphuric acid required for electrolyte by providing an acid holding container assembled during manufacture above the plates in each cell chamber of the battery.

Further object of the invention is to provide for simple release of the 1.835 specific gravity sulphuric acid from the bottom of the acid container after the cell group chamber has been filled with cold water to a point above the bottom of the sulphuric acid container.

Another object is to provide the said sulphuric acid container of a type least likely to loosen and lose any of its acid during shipment or storage.

Other objects and advantages of the invention will be shown hereinafter.

Figure 1:
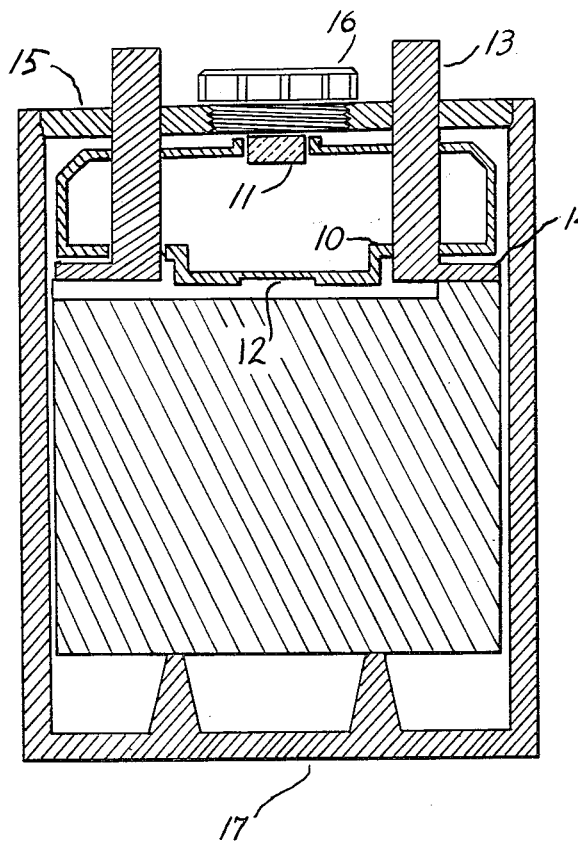

Reference to the accompanying drawings should be made after noting that Figure 1 is a vertical cross-sectional view of battery cell except for the vent filler cap which is not cross-sectional.

Figure 2:
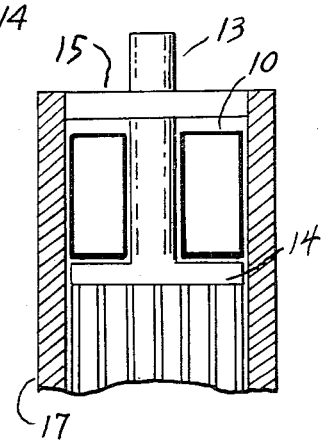

Fig. 2 is a fragmentary end view of cell after removing the end wall of the cell container and the vent filler cap.

This invention is intended to be used particularly in cells of dry-charged batteries and in referring to the drawings the acid container is shown generally at 10 and comprises a box-like structure with neck and stopper 11 similar to a bottle and constructed from glass, plastic, hard rubber or other materials suitable for retention of sulphuric acid. The bottom of acid container 10 is provided with a circular weakened section 12 directly below and concentric with the neck and stopper 11. The ends of the acid container 10 are recessed from each end toward the center for a distance allowing them to straddle a conventional battery group-post 13. The flat bottoms of the acid container 10 allow it to rest firmly upon the plate connecting strap 14. The acid container 10 can be held in its position against plate connector strap 14 by contact pressure at the top ends of the acid container 10 with the underside of cell cover 15. The acid container stopper 11 can be held secure by contact pressure with the under side of the vent filler cap 16.

To put a dry charged cell equipped with acid container 10 into operation it is only necessary to remove the vent filler cap 16 and add suitable water to the cell container 17 to a level somewhat above that of the bottom of acid container 10 after which stopper 11 is removed and the weakened section 12 is punctured by use of a solid blunt shaft such as a punch. The slow downward movement of the sulphuric acid into the water promotes a good mixing of the electrolyte which without stirring will reach a nearly uniform gravity in a few hours. The mixing and ionizing of the electrolyte will produce some heat which will be absorbed by the several pounds of submerged lead plates before it reaches a temperature comparable to that reached by the plates at time of drying or to a degree that would de-hydrate or seriously char porous rubber or plastic-bonded separators. The advantages in using this invention include lowered weight of battery for shipping, better storage characteristics and a ready to operate unit after supplying suitable water only.

What is claimed is:

1. Within a storage battery cell unit having vertical plates and horizontal plate connecting straps integral with each of two group posts, a separate, insertable, enclosed vessel consisting of an acid container constructed of a material of the group consisting of glass, hard rubber, plastic, ceramics and wax impregnated paper and having box-like structure with a neck and a stopper therein at the top and recessed ends permitting assembly within conventional batteries with the non-recessed portions of the ends of the vessel extending past the group posts to the ends of the cell and the bottom of the acid container resting on the plate connector straps and held in place by the abutment of the cell cover with the top of said acid container.

2. A storage battery cell unit acid container, as in claim 1, having a circular weak section at the bottom thereof which is directly below and concentric with the aforesaid neck and stopper at the top.

3. A storage battery cell unit acid container as in claim 1, wherein the retention of the stopper in the neck is insured by the abutment of the stopper with the underside of the vent filler cap.

References Cited in the file of this patent

UNITED STATES PATENTS

| | | |
|---|---|---|
| 2,223,226 | Rieser | Nov. 26, 1940 |
| 2,452,049 | Hauck | Oct. 26, 1948 |